Oct. 1, 1968 W. I. GIRDNER 3,404,242

MAGNETIC HEAD HOLDING ELEMENT

Filed June 14, 1965 2 Sheets-Sheet 1

INVENTOR
WILLIAM I. GIRDNER

BY A. C. Smith

ATTORNEY

Oct. 1, 1968 W. I. GIRDNER 3,404,242

MAGNETIC HEAD HOLDING ELEMENT

Filed June 14, 1965 2 Sheets-Sheet 2

INVENTOR
WILLIAM I. GIRDNER

BY A. C. Smith

ATTORNEY

1

3,404,242
MAGNETIC HEAD HOLDING ELEMENT

William I. Girdner, Portola Valley, Calif., assignor to Hewlett-Packard Company, Palo Alto, Calif., a corporation of California
Filed June 14, 1965, Ser. No. 463,496
5 Claims. (Cl. 179—100.2)

ABSTRACT OF THE DISCLOSURE

A generally spool-shaped member is formed from a body of nonmagnetic material. Circular shoulders are formed around the central portion of this spool-shaped member. A pair of matching bracket-shaped side frames are then formed from portions of the spool-shaped member on opposite sides of a plane containing its longitudinal axis. These matching side frames are joined together to provide a pair of spaced, oppositely facing, convexly arcuate inner surfaces having pairs of spaced, oppositely facing, transversly aligned shoulders. An electromagnetic transducer is fixedly engaged between each of these pairs of shoulders, and a shielding element is fixedly positioned on each side of each transducer between the oppositely facing, convexly arcuate inner surfaces of the side frames.

This invention relates to magnetic transducer heads and methods for making the same.

The principal object of this invention is to provide an improved magnetic transducer head and an inexpensive method for making the same.

Other and incidental objects of this invention will become apparent from a reading of this specification and an inspection of the accompanying drawing in which.

Figure 1:
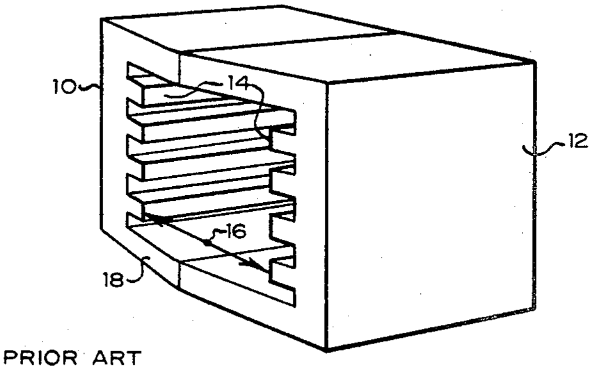
PRIOR ART Figure 1
FIGURE 1 shows the side frame of a magnetic transducer head of the prior art.

Referring to FIGURE 1, there is shown the side frame of a conventional magnetic transducer head comprising two generally bracket-shaped matching halves 10 and 12 which are fastened together face-to-face. Each half is made of a non-magnetic material such as aluminum. The flat vertical inner surface of each half is interrupted by a plurality of rectilinear shoulders 14 for supporting the magnetic elements (not shown) of the transducer head. It is important that the distance 16 between opposite shoulders 14 be as large as possible at the contact surface 18 of the side frame. This distance 16 is limited by the requirement of a small side frame that is structurally rigid. For each half the shoulder pattern must be held to very close tolerances dimensionally and should be, insofar as possible, the mirror image of the shoulder pattern of the other half. Typically, the shoulders 14 are formed individually by a precision milling operation which is very costly.

Figure 2:
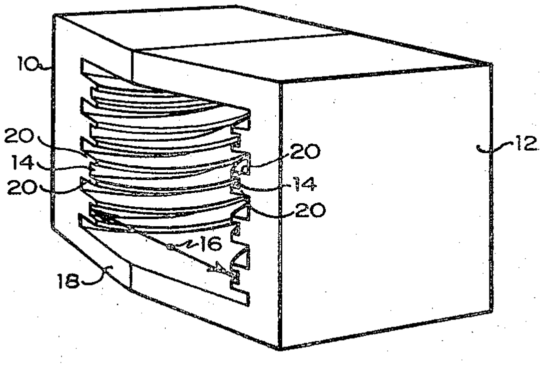
FIGURE 2 shows the side frame of a magnetic transducer head in accordance with this invention.
Figures 3B, 3C:
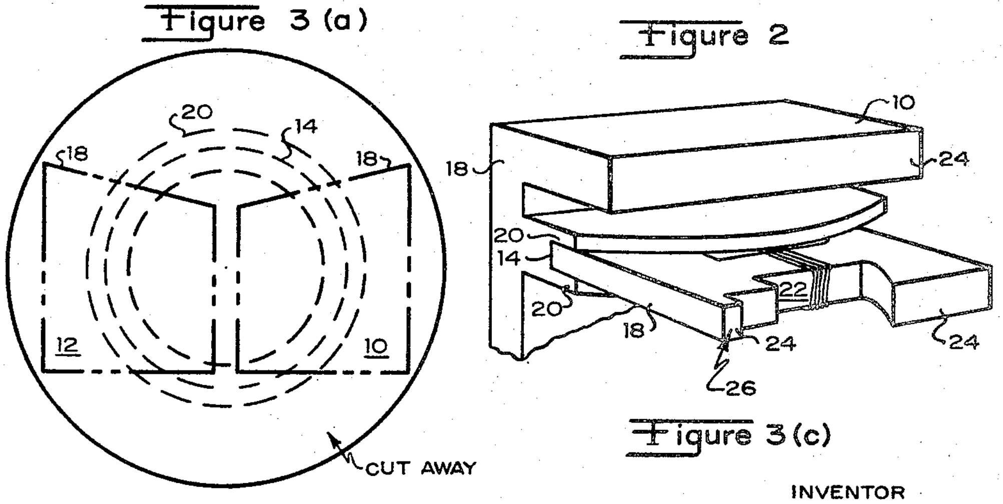

Referring now to FIGURE 2, there is shown the side frame of a magnetic transducer head according to one embodiment of this invention comprising two generally bracket-shaped matching halves 10 and 12 of non-magnetic material. These halves 10 and 12 have oppositely sloping front surfaces rounded to an appropriate radius at the apex thereof to provide the side frame with a generally convex contact surface 18. Each half has an arcuate vertical inner surface interrupted by a plurality of arcuate shoulders 14. The arcuate vertical inner surface of each half makes it possible to increase the distance

2

16 between opposite arcuate shoulders 14 at the contact surface 18 of the side frame without loss of structural rigidity because of the increased non-magnetic material towards the center of each half. The shoulders 14 may be provided with a flat surface or with lips 20 as shown in the drawing to more rigidly support the magnetic elements of the transducer head. In either case the shoulder pattern of each half is formed by a method described below so as to be dimensionally stable and precise and substantially the mirror image of the shoulder pattern of the other half.

Figure 3:
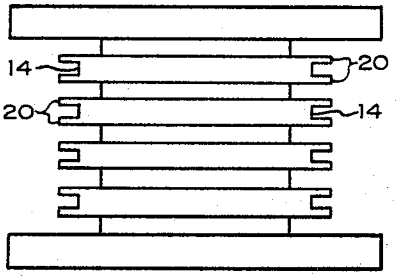
FIGURE 3 shows the method of making a magnetic transducer head in accordance with this invention.

According to this invention, the magnetic transducer head may be made by the method indicated in FIGURE 3. In making the side frame a shaft of the desired non-magnetic material is rigidly mounted for rotation about its longitudinal axis and is cut during such rotation to form the spool-shaped member shown in the elevational view of FIGURE 3(*a*). The plurality of circular shoulders 14 each having a pair of circular lips 20 is also formed during rotation of the shaft, for example, with a multi-element cutter adjusted to give the desired shoulder pattern. This operation may be simply performed with the required precision by a conventional screw machine. The spool-shaped member is next cut in half and machined to form the appropriately shaped halves 10 and 12 of the side frame as indicated in FIGURE 3(*b*) which is a top view of the spool-shaped member of FIGURE 3(*a*).

This method of making the side frame for the magnetic transducer head is more simple and substantially less expensive than the conventional method of precision milling the individual shoulders for each half of the side frame. Moreover, the reduction in cost is obtained without any sacrifice in dimensional precision, identity of the matched halves, and structural rigidity. In fact, there may be significant improvement in the first two of these features due to the concentricity maintained during simultaneous formation of the two halves and in the last feature due to the arcuate vertical inner surface of each half.

The transducer head is completed by rigidly positioning an electromagnetic element 22 between the lips 20 of each shoulder 14 of the matching halves of the side frame as indicated in FIGURE 3(*c*). These matching assemblies are then lapped to provide each with a smooth mating face 24. The lapped pole tip 26 of each electromagnetic element is next coated with a non-magnetic material, and the matching assemblies are joined together at the mating faces 24 thereof. Shielding elements 36 and 40 (shown in FIGURE 4) are then firmly positioned on either side of each electromagnetic element 22. Finally, the contact surface 18 of the completed magnetic transducer head is provided with a smooth finish.

Figure 4A:
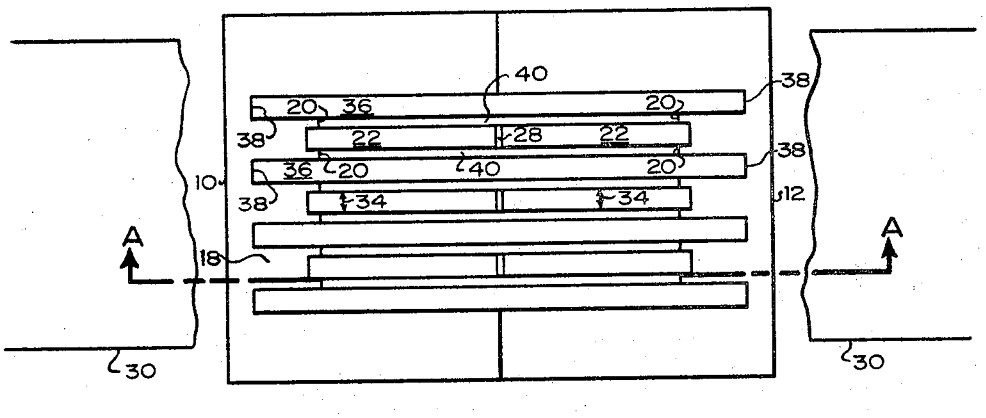
FIGURE 4 shows a completed magnetic transducer head made in accordance with the method of FIGURE 3.
Figure 4B:
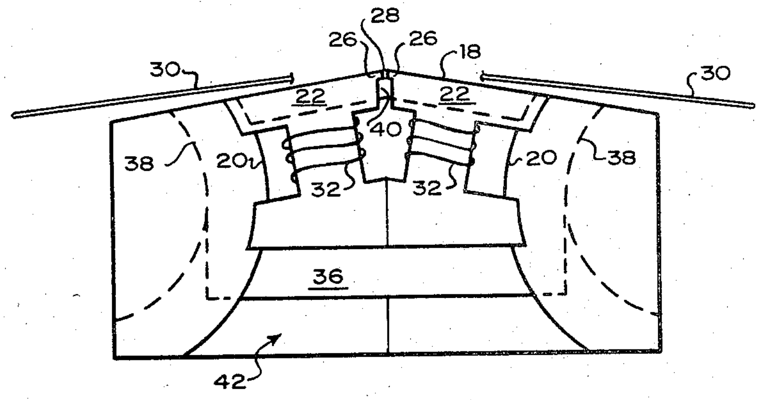

Referring to FIGURES 4(*a*) and (*b*) there is shown a front elevational view and a sectional view respectively of a completed magnetic transducer head. Two matching electromagnetic elements 22 are firmly positioned between the lips 20 of opposite shoulders of the matching halves 10 and 12. These electromagnetic elements 22 are generally I-shaped and are made of a transformer iron core material. The pole tips 26 of the matching electromagnetic elements define a narrow gap 28 (shown greatly exaggerated in the drawing) which is filled with a non-magnetic material. If the magnetic transducer head is operated as a recording head, the input signals to be recorded are fed to one or more coils 32 wound around the electromagnetic elements 22 as the record medium 30 is moved past this narrow gap 28. If it is operated as a playback head, the movement of the record medium 30 past the gap 28 causes output signals to be generated in the coils 32 wound on the electromagnetic elements.

Shielding plates 36 made of a mixture of magnetic and non-magnetic materials are firmly positioned between the opposite surfaces 38 to prevent cross-talk between the signals associated with each electromagnetic element 22. Additional shielding strips 40 are firmly positioned at the contact surface 18 in the space between the opposite lips 20. These shielding strips 40 and the corresponding lips 20 are made sufficiently thick to provide clearance between the coils 32 and the adjacent shielding plates 36 so as to permit the leads from the coils to be brought out the back side 42 of the magnetic transducer head.

I claim:

1. A magnetic transducer head comprising:

a side frame including a pair of generally bracket-shaped matching halves of non-magnetic material joined together face-to-face;

said halves having an outer reference surface and a pair of spaced, oppositely facing, convexly arcuate inner surfaces, said inner surfaces having at least one pair of spaced, oppositely facing, convexly arcuate shoulders positioned in transverse alignment;

an electromagnetic element including a pair of pole tips separated by a non-magnetic gap, said electromagnetic element being rigidly positioned between said inner surfaces in fixed engagement with said pair of oppositely facing, convexly arcuate shoulders to position a face of said pole tips and said non-magnetic gap adjacent to said outer reference surface; and shielding elements fixedly positioned on opposite sides of said electromagnetic element between said oppositely facing, convexly arcuate inner surfaces.

2. A magnetic transducer head comprising:

a side frame including a pair of generally bracket-shaped matching halves of non-magnetic material joined together in face-to-face relationship;

said halves having a pair of spaced, oppositely facing, generally convex inner surfaces positioned in transverse alignment; and an electromagnetic transducer positioned between said oppositely facing, generally convex inner surfaces in fixed engagement therewith.

3. A magnetic transducer head as in claim 2 wherein said transducer includes oppositely facing, generally concave mounting faces that mate with said oppositely facing, generally convex, transversely aligned inner surfaces.

4. A magnetic transducer head as in claim 3 wherein:

said inner surfaces have at least one pair of spaced, oppositely facing, generally convex shoulders positioned in transverse alignment; and the mounting faces of said transducer are positioned in fixed mating engagement with said shoulders.

5. A magnetic transducer head as in claim 4 wherein:

each of said shoulders has a pair of generally convex lips; and the mounting faces of said transducer are positioned in fixed mating engagement with said shoulders between said lips.

References Cited

UNITED STATES PATENTS

| | | | |
|---|---|---|---|
| 2,888,522 | 5/1959 | McCutchen et al. | 179—100.2 |
| 3,349,193 | 10/1967 | Vice | 179—100.2 |

BERNARD KONICK, *Primary Examiner.*

J. R. GOUDEAU, *Assistant Examiner.*